United States Patent
Schmid et al.

(10) Patent No.: US 6,988,601 B2
(45) Date of Patent: Jan. 24, 2006

(54) TORQUE CONVERTER

(75) Inventors: Herbert Schmid, Münnerstadt (DE); Herbert Johann, Würzburg (DE)

(73) Assignee: ZF Sachs AG, Schweinfurt (DE)

( * ) Notice: Subject to any disclaimer, the term of this patent is extended or adjusted under 35 U.S.C. 154(b) by 62 days.

(21) Appl. No.: 10/824,921

(22) Filed: Apr. 15, 2004

(65) Prior Publication Data
US 2004/0206593 A1 Oct. 21, 2004

(30) Foreign Application Priority Data
Apr. 17, 2003 (DE) ................................ 103 17 634

(51) Int. Cl.
*F16H 45/02* (2006.01)

(52) U.S. Cl. .............. 192/3.29; 192/70.17; 192/110 B; 192/212; 60/338

(58) Field of Classification Search ............. 192/55.61; 60/338
See application file for complete search history.

(56) References Cited

U.S. PATENT DOCUMENTS

| | | | |
|---|---|---|---|
| 5,975,261 A | 11/1999 | Woerner et al. | |
| 6,142,272 A * | 11/2000 | Meisner et al. | 192/3.29 |
| 6,244,401 B1 * | 6/2001 | Maienschein et al. | 192/3.3 |
| 6,758,315 B2 * | 7/2004 | Bauer et al. | 192/3.29 |
| 6,832,672 B2 * | 12/2004 | Bauer et al. | 192/3.29 |
| 2003/0178275 A1 * | 9/2003 | Breier et al. | 192/3.29 |

FOREIGN PATENT DOCUMENTS

DE 4333562 A1 * 4/1994
DE 197 52 187 A1 6/1999

* cited by examiner

*Primary Examiner*—Richard M. Lorence
(74) *Attorney, Agent, or Firm*—Cohen, Pontani, Lieberman & Pavane

(57) ABSTRACT

A torque converter which has a pump wheel, a turbine wheel, and a stator, which form a hydrodynamic circuit, and also a torsional vibration damper with a primary and a secondary damper element. The primary and the secondary damper element are connected to each other in a rotationally elastic manner by at least one set of springs. The turbine wheel has a turbine wheel shell and is supported rotatably with respect to a turbine wheel hub in a first bearing, which provides axial and radial support. The secondary damper element is mounted nonrotatably on the turbine wheel hub. The turbine wheel acts by way of an intermediate element on the primary damper element. The stator is mounted on a stator hub, which is supported by an axially operative second bearing on a turbine wheel base, which is connected to the turbine wheel shell. The first bearing is located radially outside the second bearing.

15 Claims, 1 Drawing Sheet

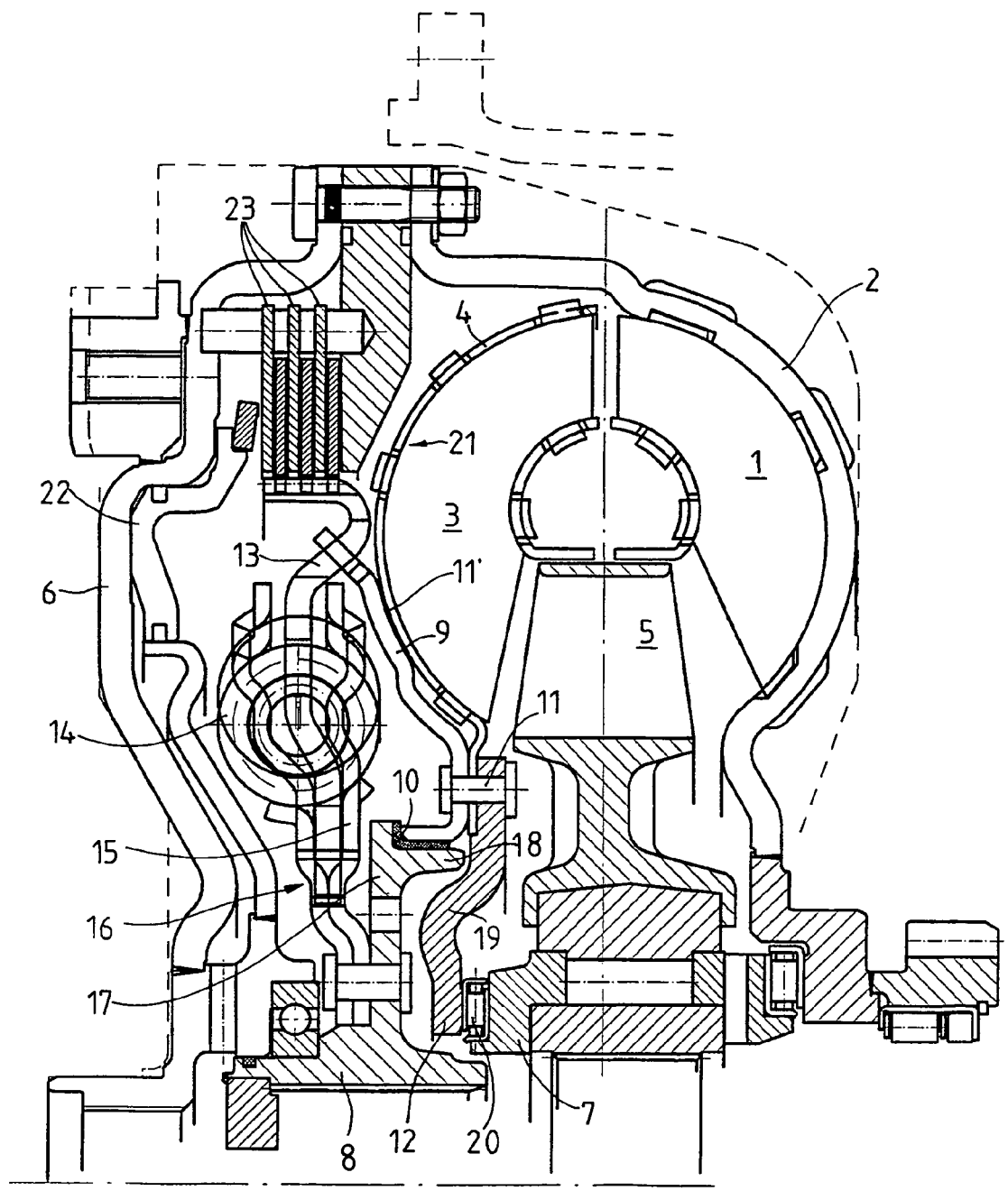

TORQUE CONVERTER

BACKGROUND OF THE INVENTION

1. Field of the Invention

The present invention pertains to a torque converter with a pump wheel, a turbine wheel, and a stator, which form a hydrodynamic circuit, and also with a torsional vibration damper with primary and secondary damper elements, which are connected to each other by at least one set of springs, wherein the turbine wheel has a turbine wheel shell and is supported rotatably with respect to a turbine wheel hub by a first bearing, which provides both axial and radial support;

wherein the secondary damper element is connected nonrotatably to the turbine wheel hub, and the turbine wheel acts on the primary damper element; and wherein the stator is located on a stator hub, which is supported by an axially operative second bearing against the turbine wheel base, which is connected to the turbine wheel shell.

2. Description of the Related Art

A torque converter of this type is known, for example, from U.S. Pat. No. 5,975,261. In this torque converter, the turbine wheel base has a very complicated design. In particular, it has an area extending in the axial direction which passes through an opening in the secondary damper part in order to realize a rotational angle limiting function. The turbine wheel base of the known torque converter is therefore difficult to fabricate. In addition, it is very heavy. Because of its great weight, it is also difficult if not impossible to weld it to the turbine wheel shell. Finally, the torque is transmitted from the turbine wheel shell via the turbine wheel base, i.e., radially toward the inside, to the primary damper part, which means that the connection between the turbine wheel shell and the turbine wheel base must be very strong.

SUMMARY OF THE INVENTION

The object of the present invention is to develop a torque converter of the general type in question in such a way that it is simpler in design and easier to fabricate. In particular, the turbine wheel base is to be simpler and lighter in weight.

The object is achieved by locating the first bearing radially outside the second bearing, and by the turbine wheel acting on the primary damper element by way of an intermediate element.

The design of the torque converter can be made simpler by connecting the intermediate element, the turbine wheel shell, and the turbine wheel base to each other by common connecting elements. The connecting elements are preferably designed in the form of rivets.

The torque converter can be made even more compact by having the intermediate element conform to the shape of the part of the turbine wheel shell against which it rests. This idea is even more effective when the intermediate element is located in an area which is farther inward in the radial direction than the part of the turbine wheel shell which extends the farthest in the axial direction.

A simple and reliable connection between the intermediate element and the primary damper element can be obtained by providing the elements with teeth, by which the intermediate element and the primary damper element engage with each other.

Converter losses can be minimized or even eliminated by providing a bridging clutch, which is in working connection with the primary damper element. The bridging clutch can have several clutch disks arranged axially in a row so that it can transmit high torques.

The torque converter can be made even more compact by having the primary damper element form a rotational angle limiter in the area where it engages with the secondary damper element, this limiter being located no farther out radially than the first bearing. The rotational angle limiter can be formed, for example, by sets of teeth on the primary and secondary damper elements, by which they engage with each other with play in the circumferential direction.

So that the first bearing can be mounted relatively far out in the radial direction, the turbine wheel hub preferably has a radial web, on the radially outer end of which a flange is provided. The first bearing is then mounted on the radially outer surface of the flange.

The amount of axial space required can be reduced even more by extending the turbine wheel base radially inward from the turbine wheel shell; by providing the turbine wheel base with a bent section underneath the flange, so that its radially inner section extends under the flange; and by mounting the second bearing at the radially inner end of the turbine wheel base.

The first bearing is designed preferably as a plain bearing bush with an L-shaped cross section. The second bearing is preferably designed as a roller bearing, especially as a ball bearing.

Additional advantages and details can be derived from the following description of an exemplary embodiment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE shows a partial cross section through a torque converter.

DETAILED DESCRIPTION OF THE PRESENTLY PREFERRED EMBODIMENTS

According to FIG. 1, a torque converter has a pump wheel 1 with a pump wheel shell 2 and a turbine wheel 3 with a turbine wheel shell 4. A stator 5 is provided between the pump wheel 1 and the turbine wheel 3. The pump wheel 1, the turbine wheel 3, and the stator 5 form a hydrodynamic circuit.

The pump wheel shell 2, as generally known, is connected nonrotatably to a converter housing 6. The converter housing 6 is in turn connected nonrotatably to a crankshaft of an internal combustion engine (not shown). The stator 5 is supported on a stator hub 7.

The turbine wheel 3 can be driven by the pump wheel 1. The turbine wheel 3 is supported by way of the intermediate element 9 on the turbine wheel hub 8 by a bearing 10, which provides both axial and radial support, so that the turbine wheel shell 4 is free to rotate with respect to the turbine wheel hub 8. The first bearing 10 is designed in the present case as a plain bearing with an L-shaped cross section.

Because of its location in the immediate area of the turbine wheel shell 4, it provides very stable support for the turbine wheel 3.

The intermediate element 9 is connected nonrotatably to the turbine wheel shell 4 by way of connecting elements 11 at a point relatively far out in the radial direction, a connection which therefore can be made easily in terms of production operations. Thus high torque can be transmitted without any further measures. The connecting elements 11 are designed as rivets 11, as shown by way of example in the FIGURE. A direct weld 11' of the intermediate element 9 to the turbine wheel shell 4 can also be provided as a supplement. This is possible in particular because the intermediate element 9, although thicker than the turbine wheel shell 4, is not more than twice as thick.

In the present case, the connecting elements 11 connect not only the turbine wheel shell 4 and the intermediate element 9 to each other but also a turbine wheel base 12 to the first two parts, as will be discussed in greater detail below. Thus this component, too, can be connected easily to the turbine wheel shell 4.

According to the FIGURE, the intermediate element 9 is located in an area which is farther inward radially than the area of the turbine wheel shell 4 which extends the farthest in the axial direction. It conforms, as can be seen, to the shape of the part of the turbine wheel shell 4 against which it rests.

The radially outer end of the intermediate element 9 fits into a primary damper element 13. In particular, the intermediate element 9 can have teeth which mesh with the teeth on a primary damper element 13. By way of the intermediate element 9, therefore, the turbine wheel 3 can act on the primary damper element 13.

The primary damper element 13 is connected in a rotationally elastic manner to a secondary damper element 15 by means of at least one set of springs 14. The primary damper element 13, the set of springs 14, and the secondary damper element 15 together form a torsional vibration damper. The primary damper element 13 forms a rotational angle limiter in the area 16 where it engages with the secondary damper element 15; in the present case, this limiter is designed as a set of teeth on the primary damper element 13, which engages with another set of teeth on the secondary element 15 with play in the circumferential direction. There is no need for the secondary damper element 15 to pass axially through the primary damper element 13. The secondary damper element 15 is mounted nonrotatably on the turbine wheel hub 8. The engagement area 16 is located farther inward in the radial direction than the set of springs 14. It is also located no farther out in the radial direction than the plain bearing 10. It is preferably located radially farther inward than the bearing 10.

The turbine wheel hub 8 has a radial web 17. On the radially outer end of the radial web 17, a flange 18 is provided. The plain bearing 10 is mounted on the radially outer surface of the flange 18.

The turbine wheel base 12 extends without support from the turbine wheel shell 4 radially toward the inside. This unsupported design is made possible in particular by the arrangement of the first bearing 10 between the turbine wheel hub 8 and the intermediate element 9. The base has a bent section 19 underneath the flange 18. As a result, its radially inner section extends under the flange 18.

At the radially inner end of the turbine wheel base 12, and therefore in an area farther inward radially than the plain bearing 10, there is an axially operative second bearing 20. This is in the present case designed as a roller bearing 20, namely, as a ball bearing 20. The stator hub 7 is supported axially by this roller bearing 20 against the turbine wheel base 12. The roller bearing 20 has pass-through openings for the converter fluid. These types of pass-through openings are conventional and known in themselves; see, for example, DE 197 52 187 A1. These pass-through openings have therefore been omitted from the drawing.

In the torque converter according to the invention, furthermore, a bridging clutch 21 is also provided. The bridging clutch 21 is in working connection with the primary damper element 13. The bridging clutch 21 can be opened and closed by means of an actuating piston 22. According to the FIGURE, it has several clutch disks 23 arranged axially in a row. This allows the bridging clutch 21 to transmit high torques.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torque converter comprising:
    a pump wheel;
    a turbine wheel comprising a turbine wheel shell and a turbine wheel base connected to said shell, said turbine wheel being supported axially and radially with respect to a turbine wheel hub by a first bearing;
    a stator provided between the pump wheel and the turbine wheel, said stator being mounted on a stator hub which is supported axially against said turbine wheel base by a second bearing located radially inside of the first bearing, said pump wheel, said turbine wheel, and said stator forming a hydrodynamic circuit,
    a primary damper element which is acted on by the turbine wheel by way of an intermediate element; and
    a secondary damper element which is fixed against rotation with respect to said turbine wheel hub and is connected to said primary damper element in a rotationally elastic manner by a set of springs.

2. A torque converter as in claim 1 wherein the intermediate element, the turbine wheel shell, and the turbine wheel base are connected to each other by common connecting elements.

3. A torque converter as in claim 2 wherein said connecting elements are rivets.

4. A torque converter as in claim 1 wherein said turbine wheel has a part against which the intermediate element rests, said part having a shape, said intermediate element conforming to said shape.

5. A torque converter as in claim 1 wherein the turbine wheel shell has an area of maximum axial dimension, said intermediate element being located radially inward of said area of maximum axial dimension.

6. A torque converter as in claim 1 wherein the intermediate element and the primary damper element each comprise teeth, the teeth of the intermediate element engaging the teeth of the primary damper element.

7. A torque converter as in claim 1 further comprising a bridging clutch connecting the pump wheel to the primary damper element.

8. A torque converter as in claim 7 wherein the bridging clutch comprises a plurality of axially aligned clutch disks.

9. A torque converter as in claim 1 wherein the primary damper element engages the secondary damper element to form a rotational angle limiter, said limiter being located radially inward of said first bearing.

10. A torque converter as in claim 9 wherein said primary damper element and said secondary damper element have teeth which engage with circumferential play to form said rotational angle limiter.

11. A torque converter as in claim 1 wherein the turbine wheel hub comprises a radial web having a radially outer end provided with an axially extending flange having a radially outside surface, said first bearing being located on the radially outside surface of the flange.

12. A torque converter as in claim 11 wherein said turbine wheel base extends radially inward from said turbine wheel shell, said base having a bent section which extends axially under said flange and a radially inner end, said second bearing lying against said radially inner end.

13. A torque converter as in claim 1 wherein said first bearing is a plain bearing having an L-shaped cross-section.

14. A torque converter as in claim 1 wherein the second bearing is a roller bearing.

15. A torque converter as in claim 14 wherein the roller bearing is a ball bearing.

* * * * *